Oct. 3, 1939.     C. W. SINCLAIR     2,174,639
METHOD OF FORMING WHEELS
Filed July 22, 1935     4 Sheets-Sheet 1
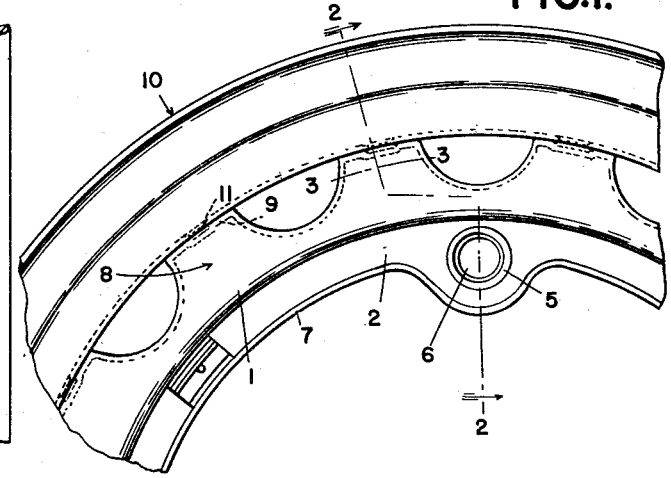
FIG.2.     FIG.1.
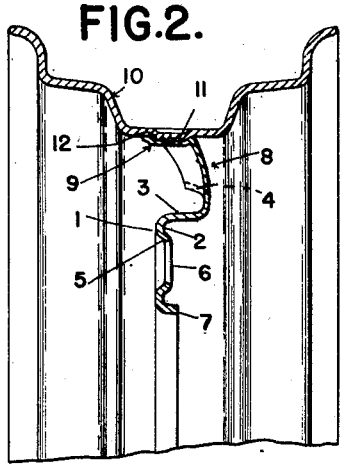
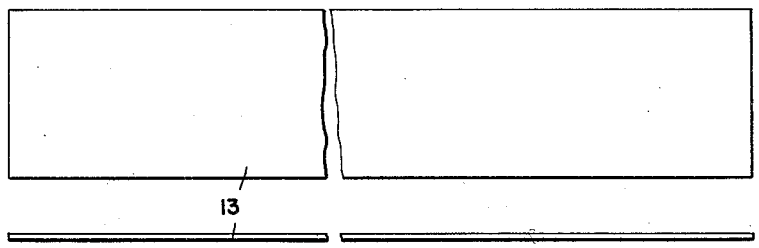
FIG.5.
FIG.4.
FIG.6.
FIG.3.
FIG.7.
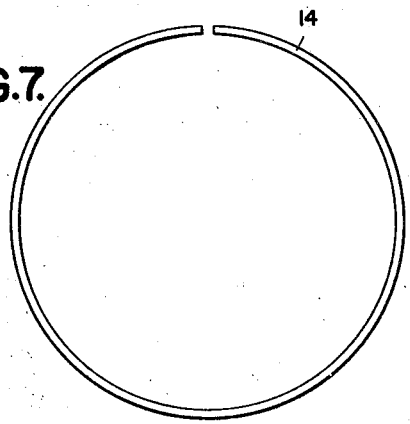
INVENTOR
CHARLES W. SINCLAIR
BY
ATTORNEYS Oct. 3, 1939.  C. W. SINCLAIR  2,174,639
METHOD OF FORMING WHEELS
Filed July 22, 1935  4 Sheets-Sheet 2

INVENTOR
CHARLES W. SINCLAIR
BY
ATTORNEYS

Oct. 3, 1939.　　　C. W. SINCLAIR　　　2,174,639

METHOD OF FORMING WHEELS

Filed July 22, 1935　　　4 Sheets-Sheet 3

INVENTOR
CHARLES W. SINCLAIR

ATTORNEYS

Oct. 3, 1939.  C. W. SINCLAIR  2,174,639
METHOD OF FORMING WHEELS
Filed July 22, 1935  4 Sheets-Sheet 4
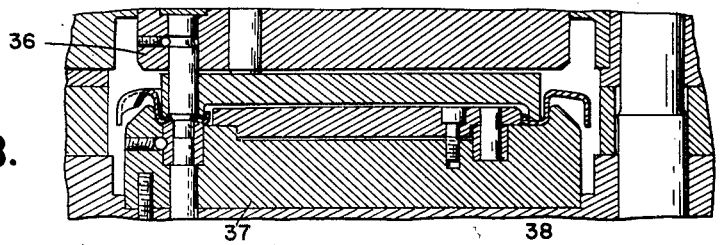
FIG.18.
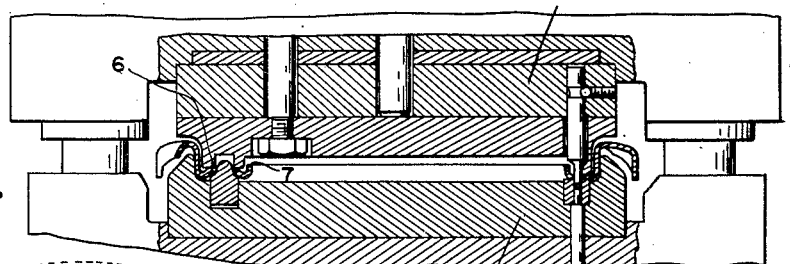
FIG.19.
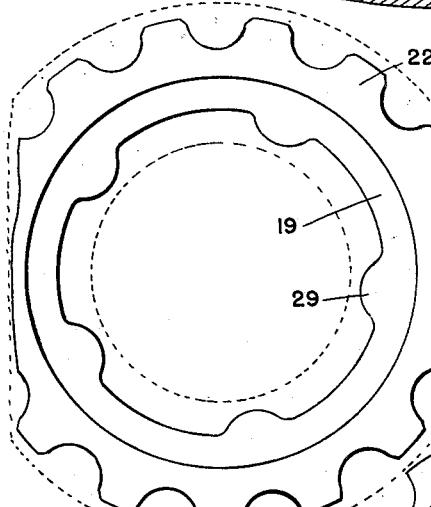
FIG.22.
FIG.23.
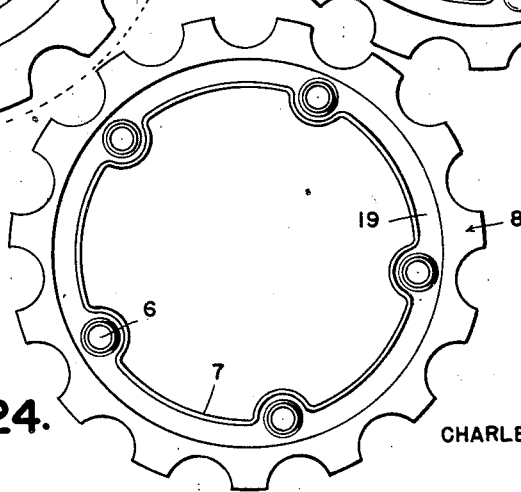
FIG.24.
INVENTOR
CHARLES W. SINCLAIR
BY
ATTORNEYS Patented Oct. 3, 1939

2,174,639

UNITED STATES PATENT OFFICE 2,174,639

METHOD OF FORMING WHEELS

Charles W. Sinclair, Detroit, Mich., assignor to Kelsey-Hayes Wheel Company, Detroit, Mich., a corporation of Delaware Application July 22, 1935, Serial No. 32,655

16 Claims. (Cl. 29—159.03)

The invention relates to the manufacture of sheet metal spokes vehicle wheels and refers more particularly to the manufacture of that type of wheel having spokes merging at their radially inner ends into a nave of relatively large diameter.

One of the objects of the invention is to obtain a method of forming the wheel from a sheet metal strip to thereby reduce the loss of material. Other objects are to form the wheel by cold pressing operations; to so form the wheel that its gauge increases radially toward its inner periphery; and to so form the spokes that they are hollow. A further object is to simplify the operations required for completing the wheel.

These and other objects of the invention will become apparent from the following description, taken in connection with the accompanying drawings, in which Figure 1 is a fragmentary elevation of a wheel forming the product of my method;

Figures 2 and 3 are cross sections on the lines 2—2 and 3—3 respectively of Figure 1;

Figure 4 is an edge elevation of the original sheet metal blank;

Figure 5 is a plan view thereof;

Figures 6, 7 and 8 are edge elevations of the blank after successive steps;

Figures 12, 13, 14, 15, 16, 17, 18 and 19 are views illustrating successive steps in the method;

Figures 20, 21, 22, 23 and 24 are views showing the blanks formed by the dies of Figures 12, 13, 15, 17 and 18 respectively.

Figure 8:
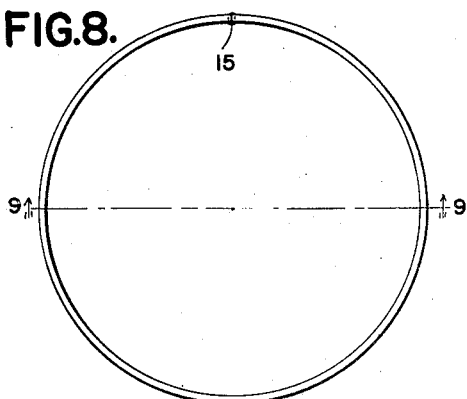

While my invention is applicable to various modified constructions of vehicle wheels, I shall describe its application to the manufacture of the wheel illustrated in Figures 1, 2 and 3, which is of the following construction:

1 is the outer hub portion of the wheel comprising the radially extending bolting-on flange 2, the axially outwardly extending flange 3 extending from the outer periphery of the bolting-on flange, and the return-bent nave portion 4 extending from the axially outer end of the flange 3. The bolting-on flange is preferably provided with the axially outward depressions 5 formed with the central holes 6 for receiving the bolts used in securing the wheel to the inner hub. The bolting-on flange also preferably terminates at its inner periphery in the axially outwardly extending flange 7. 8 are the spokes merging at their radially inner ends into the nave portion 4. These spokes are hollow and more particularly are of channel cross section with the channels opening axially inwardly of the wheel. Furthermore, these spokes are free of each other at their radially outer ends and each is provided with the integral transverse flange 9 closing the radially outer end and forming a bearing for the tire carrying rim 10. The rim is suitably secured to the spokes as by means of the radially inwardly extending depressions 11 in the rim interlocking with and welded to the recessed portions 12 formed in the flanges 9.

Figure 10:
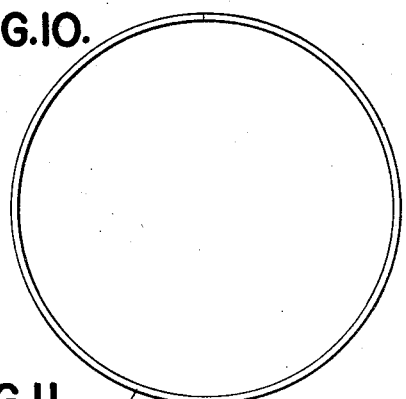
Figures 10 and 11 are views similar to Figures 8 and 9 respectively showing the blank after other steps have been carried out.
Figure 9:
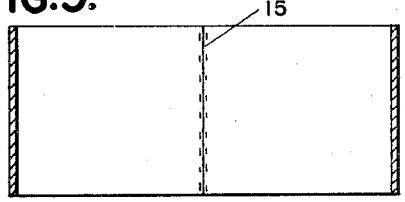
Figure 9 is a cross section on the line 9—9 of Figure 8.
Figure 11:
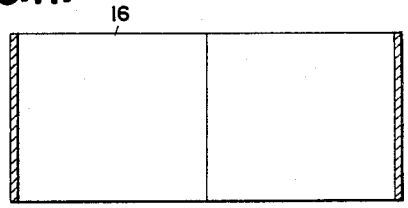

In forming a wheel such as described above from sheet metal, I originally start with the flat sheet metal strip 13, shown in Figures 4 and 5, which has mill edges and is of indeterminate length. This strip is then transversely sheared, as shown in Figure 6, to form the flat strip 14 of predetermined length, after which the strip 14 is bent into tube-like form and more particularly cylindrical form, as shown in Figure 7. The next step then consists in welding the ends of the tube-like blank together, as shown at 15 in Figures 8 and 9. After the welding step, the weld flash, both inside and outside the blank and also at the edges, is trimmed, leaving the completed blank 16, as shown in Figures 10 and 11.

Figure 21:
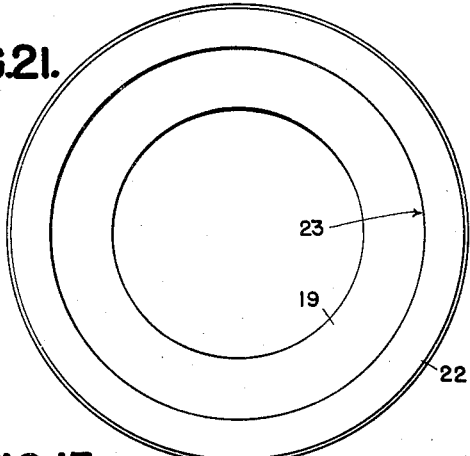
Figure 20:
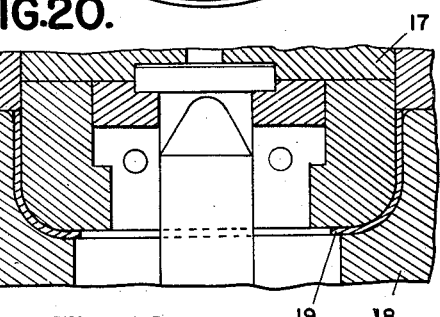
Figures 12, 13:
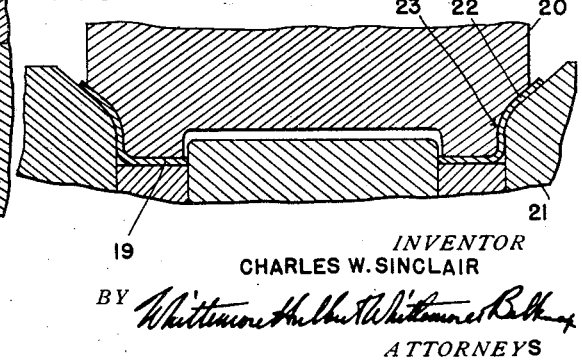

The blank 16 is pressed between the dies 17 and 18, as shown in Figure 12, to cup the blank. During this cupping step one edge of the tube-like blank is contracted and bent radially inwardly toward the axis of the blank to produce the flange 19. The contracting produces an upsetting of the metal and increases the gauge of the metal toward the inner periphery. The blank, after this step, is as shown in Figures 12 and 20. The blank is next pressed between the dies 20 and 21, as shown in Figure 13, to expand and more particularly flare the other edge of the blank and thereby produce the flared portion 22. This progressive expanding draws the metal of the flared portion and progressively decreases its gauge toward its free edge. The dies 20 and 21 also flatten the flange 19 so that the blank 23, after this step has been carried out, is as shown in Figures 13 and 21.

Figure 14:
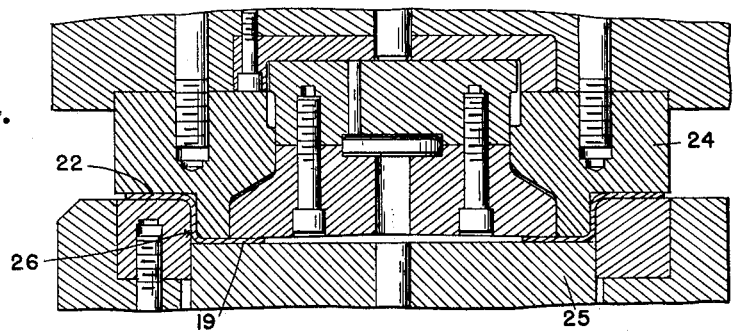
Figure 15:
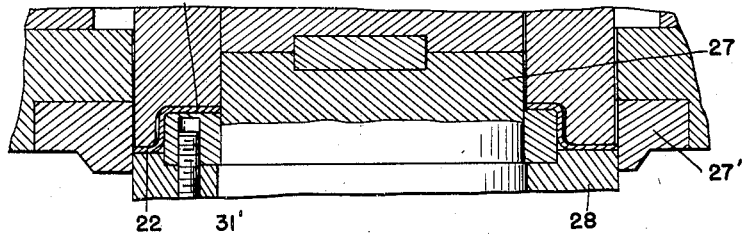
Figure 16:
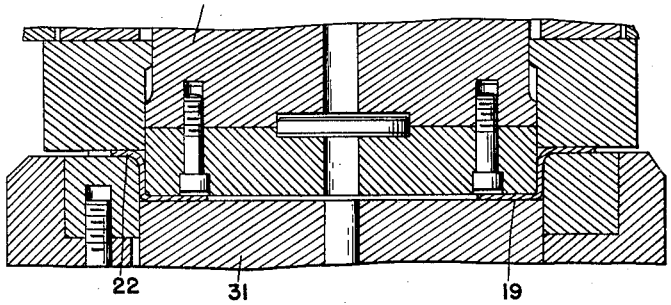

The next step consists in fashioning the blank 23 by means of the dies 24 and 25, as shown in Figure 14. These dies flatten the flared portion 22 of the blank 23 so that it extends radially of or at right angles to the axis of the blank 26 formed by this step. The blank 26 is then trimmed by means of the dies 27 and 27' and 28, shown in Figure 15. These dies remove the free edge portion or inner periphery of the flange 19 to form the same with the peripherally spaced arcuate projections 29 and also remove portions of the metal from the flattened portion 22 to form the peripherally spaced scallops 30. The blank after this step is as shown in Figures 15 and 22. The trimmed blank is then pressed between the dies 31 and 31', shown in Figure 16, to true up the blank and to give it the proper dimensions.

Figure 17:
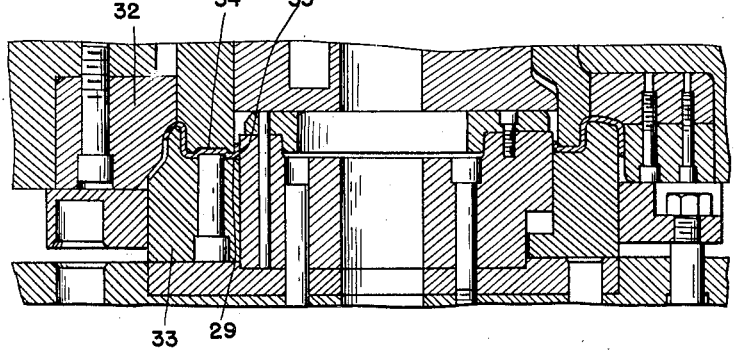

After this step, the scallops 30 are fashioned into the hollow spokes by being pressed between the dies 32 and 33, shown in Figure 17. These dies axially bend the periphery of the blank to form the same with a continuous axial flange and as a result they form the scallops into spokes of channel cross section having at their radially outer ends transverse flanges closing the channels. The dies also operate to form the bubbles 34 in the flange 19 which register with the projections 29 and further form the axial flange 35 at the inner periphery or free edge of the flange 19, the blank at this time being as shown in Figures 17 and 23.

The next step consists in piercing and swaging the bubbles 34, this being accomplished by the dies 36 and 37, as shown in Figure 18, which cooperate to form the tapered bolt holes in the bubbles. The blank now has the form shown in Figures 18 and 24. The blank is then operated upon by the dies 38 and 39, shown in Figure 19, these dies cooperating to form holes in the flange intermediate the bolt holes for receiving rivets used in securing the hub cap clips in place.

The blank is then assembled with the rim 10 and the base of the rim and the transverse flanges at the radially outer ends of the spokes are radially inwardly depressed to form the interlocking depressions 11 and the recessed portions 12, after which the rim is welded to the wheel by spot-welding the depressions to the flanges and the hub cap spring clips are riveted to the bolting-on flange intermediate the bolt holes, at which time the wheel is completed and has the construction shown in Figures 1 and 2.

What I claim as my invention is:

1. The method of forming sheet metal spoked wheels, which comprises providing a tube-like blank, fashioning axially spaced portions of the tube-like blank and thereby forming generally radially extending inner and outer portions and a generally axially extending portion connecting said inner and outer portions, and fashioning the outer portion and thereby forming spoke portions.

2. The method of forming sheet metal spoked wheels, which comprises providing a tube-like blank, fashioning axially spaced zones of the tube-like blank and thereby forming generally radially extending inner and outer portions and a generally axially extending portion connecting said inner and outer portions, scalloping the outer portion and fashioning the scallops and thereby forming spokes.

3. The method of forming wheels, which comprises bending a strip into tube-like form, securing the ends together, bending the edge portions of the tube-like blank in zones axially spaced from each other inwardly and outwardly respectively to provide a generally radially extending portion for attachment to a support and a generally radially extending portion for attachment to a rim and also an intermediate generally axially extending reinforcing portion of substantially the same diametral dimensions as those of that portion of the tube-like blank from which the axially extending portion is formed, and fashioning the outwardly bent portion into spoke portions.

4. The method of forming wheels, which comprises bending a strip into tube-like form, securing the ends together, bending the edge portions of the tube-like blank in zones axially spaced from each other inwardly and outwardly respectively to provide a generally radially extending inner portion for attachment to a support and a generally radially extending outer portion for attachment to a rim and also an intermediate generally axially extending reinforcing portion of substantially the same diametral dimensions as those of that portion of the tube-like blank from which the axially extending portion is formed, scalloping the outer portion and fashioning the scallops into spokes.

5. The method of forming wheels, which comprises providing a tube-like blank, contracting one edge portion and thereby forming a generally radially extending portion for attachment to a support, expanding the other edge portion in a zone axially spaced from that of the first mentioned portion and thereby forming a generally radially extending portion for attachment to a rim, the portion between the fashioned edge portions extending generally axially and serving to reinforce the wheel and being of substantially the same diametral dimensions as those of that portion of the tube-like blank from which the axially extending portion is formed and fashioning the expanded portions into spoke portions.

6. The method of forming wheels, which comprises providing a tube-like blank, contracting one edge portion and thereby forming a generally radially extending portion for attachment to a support, expanding the other edge portion in a zone axially spaced from that of the first mentioned portion and thereby forming a generally radially extending portion for attachment to a rim, the portion between the fashioned edge portions extending generally axially and serving to reinforce the wheel and being of substantially the same diametral dimensions as those of that portion of the tube-like blank from which the axially extending portion is formed, scalloping the expanded portion and fashioning the scallops into spokes.

7. The method of forming sheet metal spoked wheels, which comprises bending a sheet metal strip into tube-like form, securing the ends together, cupping the tube-like blank to form a blank having a tube-like portion and a generally radially extending flange at one edge thereof, bending the other edge portion in a zone axially spaced from the flange outwardly to form a generally radially and outwardly extending portion, scalloping the last mentioned portion and fashioning the scallops into spokes.

8. The method of forming sheet metal spoked wheels, which comprises bending a sheet metal strip into tube-like form, securing the ends together, cupping the tube-like blank to form a blank having a tube-like portion and a generally radially extending flange at one edge thereof bending the other edge portion in a zone axially spaced from the flange outwardly to form a generally radially and outwardly extending portion, and fashioning the last mentioned portion and thereby forming spoke portions.

9. The method of forming sheet metal spoked wheels, which comprises providing a tube-like blank, fashioning axially spaced zones of the tube-like blank and thereby forming generally radially extending inner and outer portions, meanwhile maintaining in substantially the same shape and size the portion of the tube-like blank connecting said inner and outer portions, scalloping the outer portion, and fashioning the scallops and thereby forming spokes.

10. The method of forming wheels, which comprises providing a tube-like blank, deforming portions of the tube-like blank in zones axially spaced from each other inwardly and outwardly respectively to provide a generally radially extending portion for attachment to a support and a generally radially extending portion for attachment to a rim, during the deforming maintaining the portion intermediate the deformed portions of substantially the same dimensions, and fashioning the outwardly deformed portion into spoke portions.

11. The method of forming wheels, which comprises providing a tube-like blank, bending portions of the tube-like blank in zones axially spaced from each other inwardly and outwardly respectively to provide a generally radially extending inner portion for attachment to a support and a generally radially extending outer portion for attachment to a rim, during the bending maintaining the portion intermediate the bent portions of substantially the same dimensions, scalloping the outer portion, and fashioning the scallops into spokes.

12. The method of forming wheels, which comprises providing a tube-like blank, contracting a portion thereof and thereby forming a generally radially extending portion for attachment to a support, expanding another portion thereof in a zone axially spaced from that of the first mentioned portion and thereby forming a generally radially extending portion for attachment to a rim, during the contracting and expanding steps maintaining substantially unchanged the portion intermediate the contracted and expanded portions whereby it extends generally axially and serves to reinforce the wheel, and fashioning the expanded portion into spoke portions.

13. The method of forming wheels, which comprises providing a tube-like blank, contracting a portion thereof and thereby forming a generally radially extending portion for attachment to a support, expanding another portion thereof in a zone axially spaced from that of the first mentioned portion and thereby forming a generally radially extending portion for attachment to a rim, during the contracting and expanding steps maintaining substantially unchanged the portion between the contracted and expanded portions whereby it extends generally axially and serves to reinforce the wheel, scalloping the expanded portion, and fashioning the scallops into spokes.

14. The method of forming sheet metal spoked wheels, which comprises providing a tube-like blank, cupping the tube-like blank to form a blank having a tube-like portion and a generally radially extending flange at one edge thereof, deforming outwardly the other edge portion in a zone axially spaced from the flange to form a generally radially and outwardly extending portion, during the deforming operation maintaining substantially unchanged the part of the tube-like portion between the flange and the deformed portion, and fashioning the deformed portion and thereby forming spoke portions.

15. The method of forming sheet metal spoked wheels, which comprises bending a sheet metal strip into tube-like form, integrating the ends by welding, fashioning axially spaced zones of the tube-like blank and thereby forming generally radially extending inner and outer portions and during the fashioning maintaining substantially unchanged the portion of the tube-like blank connecting the inner and outer portions, removing angularly spaced parts of the outer portion and thereby forming angularly spaced scallops, and bending the periphery of the scalloped blank in a direction axially of the blank and thereby forming channel-shaped spokes.

16. The method of forming sheet metal spoked wheels, which comprises bending a flat sheet metal strip into a cylindrical blank, fashioning axially spaced portions of the cylindrical blank and thereby forming generally radially extending inner and outer portions, during the fashioning maintaining in substantially the same shape and size the portion of the cylindrical blank connecting said inner and outer portions, and fashioning the outer portion and thereby forming spoke portions.

CHARLES W. SINCLAIR.